(12) United States Patent
Hernacki

(10) Patent No.: US 7,503,071 B1
(45) Date of Patent: Mar. 10, 2009

(54) NETWORK TRAFFIC IDENTIFICATION BY WAVEFORM ANALYSIS

(75) Inventor: Brian Hernacki, San Carlos, CA (US)

(73) Assignee: Symantec Corporation, Cupertino, CA (US)

( * ) Notice: Subject to any disclaimer, the term of this patent is extended or adjusted under 35 U.S.C. 154(b) by 871 days.

(21) Appl. No.: 10/677,748

(22) Filed: Oct. 1, 2003

(51) Int. Cl.
*G06F 9/00* (2006.01)
*G06F 11/00* (2006.01)
*G01R 31/08* (2006.01)
*H04J 3/16* (2006.01)

(52) U.S. Cl. .............................. 726/23; 726/11; 726/13; 726/14; 370/241; 370/252; 370/392; 370/465

(58) Field of Classification Search .................. 702/189; 713/186, 180, 181; 370/252, 210, 352, 353, 370/356, 400, 240, 241, 465, 466, 467, 392, 370/253, 395.5; 379/88.17; 726/11, 13, 726/14, 12, 23, 24, 25, 2, 27, 28, 29, 30
See application file for complete search history.

(56) References Cited

U.S. PATENT DOCUMENTS

| | | | | |
|---|---|---|---|---|
| 6,816,973 B1 * | 11/2004 | Gleichauf et al. | ............ | 726/13 |
| 6,917,902 B2 * | 7/2005 | Alexander | ................... | 702/189 |
| 6,973,574 B2 * | 12/2005 | Mihcak et al. | .............. | 713/180 |
| 7,114,646 B2 * | 10/2006 | Hillhouse | .................... | 235/375 |
| 7,158,677 B2 * | 1/2007 | Wenzel et al. | ................ | 382/203 |
| 7,170,860 B2 * | 1/2007 | Partridge et al. | ............ | 370/252 |
| 7,225,338 B2 * | 5/2007 | Khan et al. | .................. | 713/186 |
| 7,278,162 B2 * | 10/2007 | Lingafelt et al. | .............. | 726/23 |

OTHER PUBLICATIONS

Anu Ramanathan "WADeS: A Tool For Distributed Denial Of Service Attack Detection" Thesis submitted to the Office of Graduate Studies of Texas A & M University Aug. 2002.
Joshua R. Tyler "Email as Spectroscopy: Automated Discovery of Community Structure within Organizations" HP Labs, 1501 Page Mill Road, Palo Alto, CA 94304, Oct. 19, 2005.

* cited by examiner

*Primary Examiner*—Hanh Nguyen
(74) *Attorney, Agent, or Firm*—Van Pelt, Yi & James LLP

(57) ABSTRACT

A technique is disclosed for identifying network traffic. The traffic data is converted into a wave vector. The wave vector is compared with a wave template. It is then determined whether the wave vector is substantially similar to the wave template.

19 Claims, 11 Drawing Sheets

(12)  United States Patent

NETWORK TRAFFIC IDENTIFICATION BY WAVEFORM ANALYSIS

FIELD OF THE INVENTION

The present invention relates generally to computer network security. More specifically, a technique for protocol identification is disclosed.

BACKGROUND OF THE INVENTION

Network security is an important issue in modern computer networks. Technologies such as intrusion detection systems (IDSs) and firewalls are used extensively to protect computing resources on the network from unauthorized activities.

Existing systems generally rely on conventions that specify the mapping of application protocols to ports and use simple port characteristics to determine the types of network traffic going through the system. For example, the destination port for all HTTP traffic is typically port 80. A firewall configured to allow HTTP traffic typically identifies all network packets destined for port 80 as HTTP traffic, and allows them to pass through. Potential problems may arise when one type of traffic is encapsulated inside another type of traffic, a process referred to as tunneling. The packet may contain data for an application that is normally disallowed by the firewall; however, because the packet has a header indicating an allowable protocol destined for an allowable port, it typically bypasses firewall detection.

Tunneling is easy to accomplish yet difficult to detect. Many applications such as instant messaging and peer-to-peer file sharing include built-in port scanning functions to detect ports allowable by the firewall, and use those ports to tunnel traffic that may be forbidden by the firewall. Tunneling also poses a threat to IDSs, which commonly rely on port mapping to determine the application of signatures. A packet destined for an allowable port containing disallowed traffic is typically ignored, leading to no detection.

Problems also arise when services run on non-standard ports. The default behavior of most firewall systems is to disallow the traffic. For example, if a firewall is configured to allow HTTP traffic on port 80 only, traffic destined for a target server that runs its HTTP service on port 8080 is dropped and the user loses service. To provide users full service on non-standard ports typically requires opening more ports on the firewall, which increases the security risk. Services on non-standard ports are also problematic for IDSs. Since the traffic cannot be mapped to a specific protocol, the IDSs usually default to detecting everything or nothing at all. If the IDS attempts to detect everything, it tends to consume a lot of system resources (computing cycles, memory, etc) and increase the number of false positives. On the other hand, if the IDS detects nothing at all, any potential threat to the system would go undetected.

It would be desirable to have a technique that could identify network traffic without relying on the port mapping conventions. It would be useful if the technique could improve the accuracy of identification without requiring significant setup, maintenance and operating costs. The present invention addresses such needs.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, are referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1A:
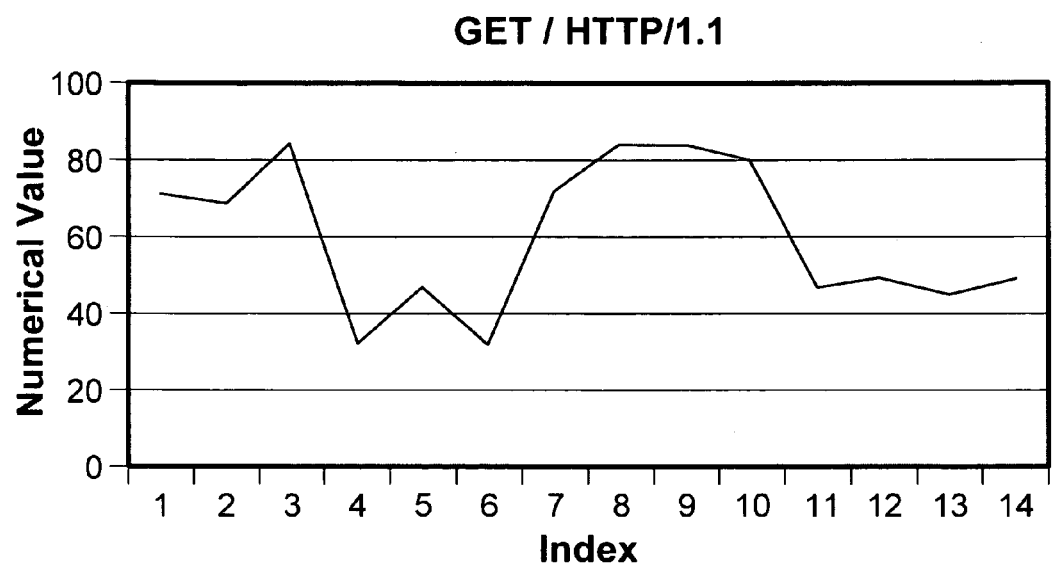
FIG. 1A is a diagram illustrating a wave plot of a wave vector, according to one embodiment.

FIG. 1A is a diagram illustrating a wave plot of a wave vector, according to one embodiment. Similar to the fingerprints of human beings, different protocols have some patterns or features that distinguish them from one another. Pattern matching data can be extracted from data packets and compared with the patterns to determine whether there is a match. Wave vectors are a type of patterns that can be used to identify data traffic. Wave vectors are numerical representations of traffic data obtained by applying a transformation to a data sequence in the traffic data. In this example, the first thirteen bytes of a hypertext transport protocol (HTTP) data packet, "GET/HTTP/1 .1" are shown to be mapped to their corresponding American Standard Code for Information Interchange (ASCII) codes. The x component of the vector corresponds to the index of the characters in the data stream and the y component of the vector corresponds the characters' ASCII code values. The resulting vector, [(71,1), (69,2), (84,3), (32,4), (47,5), (32,6), (72,7), (84,8), (84,9), (80,10), (47,11), (49,12), (46,13), (49,14)], is plotted in the diagram as waveform 150. For the purposes of illustration, the following examples use ASCII mapping to generate wave vectors, although other mapping schemes and transformation techniques may also be used. For example, the characters may be mapped to their Unicode values.

Figure 1B:
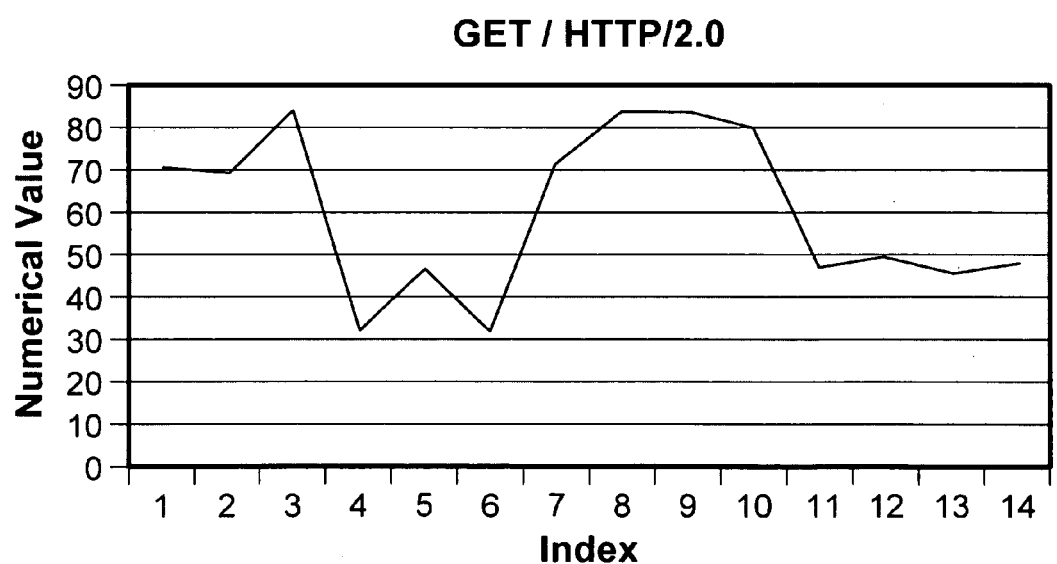
FIG. 1B is a diagram illustrating a wave plot of another wave vector.

FIG. 1B is a diagram illustrating a wave plot of another wave vector. In this example, the string "GET/HTTP/2.0" is mapped to ASCII codes, resulting in a wave vector [(71,1), (69,2), (84,3), (32,4), (47,5), (32,6), (72,7), (84,8), (84,9), (80,10), (47,11), (49,12), (46,13), (49,14)]. The wave vector is plotted as waveform 152.

Figure 1C:
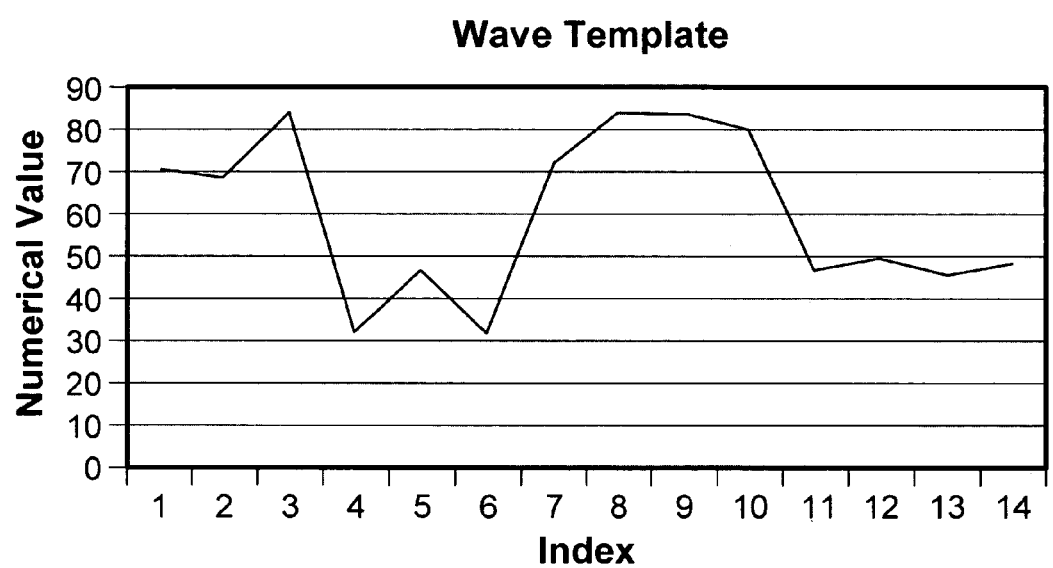
FIG. 1C is a diagram illustrating a wave template derived from the wave vectors shown in FIGS. 1A-1B.

FIG. 1C is a diagram illustrating a wave template derived from the wave vectors shown in FIGS. 1A-1B. The wave template is derived from one or more wave vectors and characterizes a particular type of traffic. In this example, the wave template is an average of the wave vectors shown in FIGS. 1A-1B, [(71,1), (69,2), (84,3), (32,4), (47,5), (32,6), (72,7), (84,8), (84,9), (80,10), (47,11), (49.5,12), (46,13), (48.5,14)]. Other techniques for deriving wave templates may also be used. In some embodiments, the traffic data is sampled, similar waveforms are grouped and then normalized to obtain the templates.

Figure 2A:
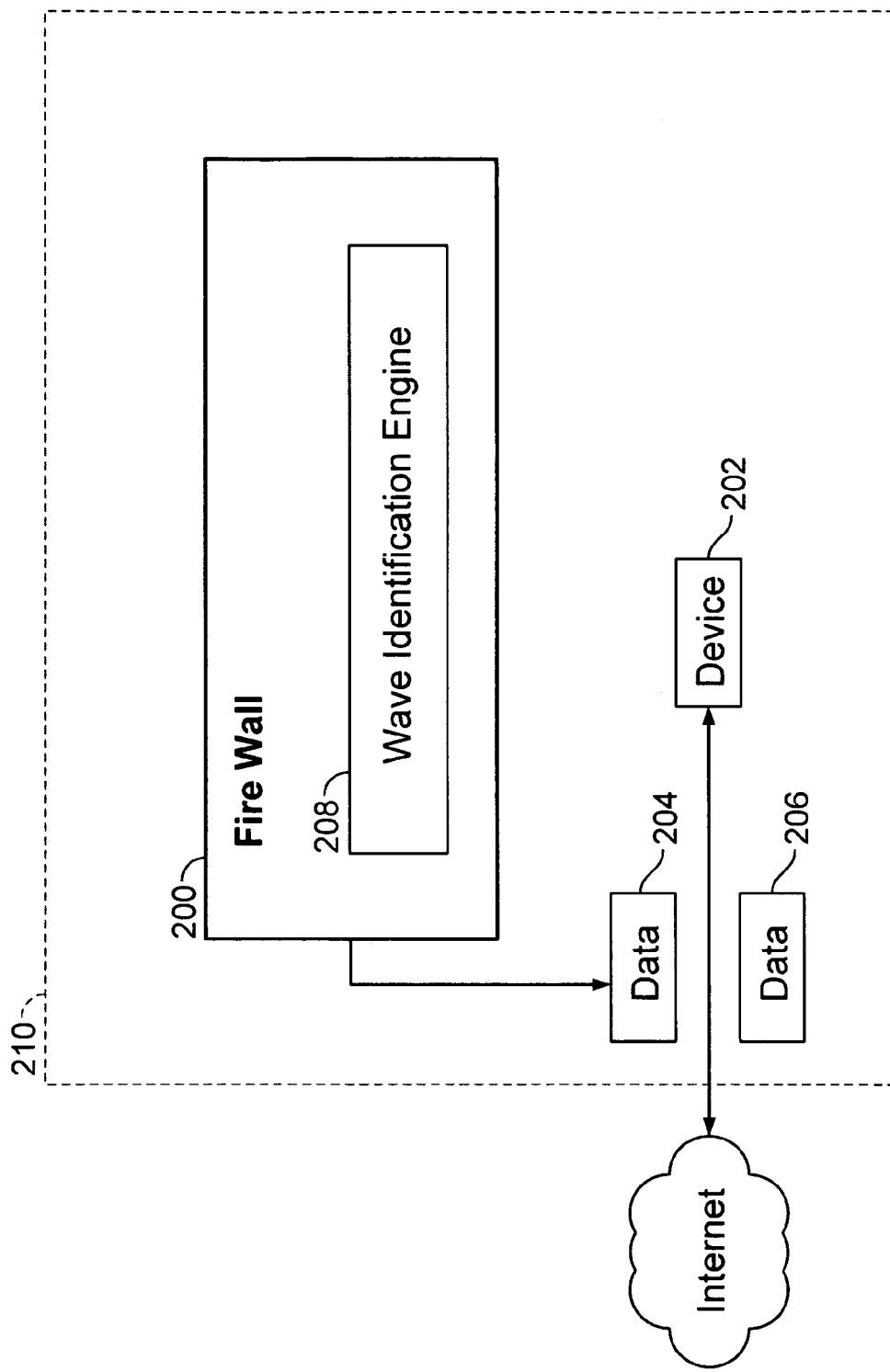
FIG. 2A is a system diagram illustrating a system that is protected by a firewall according to one embodiment.

FIG. 2A is a system diagram illustrating a system that is protected by a firewall according to one embodiment. Firewall 200 monitors and analyzes the network traffic to and from network 210, and applies policies based on its analysis. The traffic flows includes data packets, such as 204 and 206, transferred between the Internet and device 202. The firewall intercepts the packet and identifies properties associated with the traffic. For the purposes of illustration, the following examples discuss in detail the identification of protocols including application protocols and networking protocols by a firewall. It should be noted that similar techniques are also applicable for identifying other types of properties including user names, authentication state, encryption state, attachments, etc.

To identify the protocol, the firewall invokes a wave identification engine 208 to process the intercepted data. The wave identification engine compares a wave vector of the data with wave templates of known protocols. The wave identification engine is configured to be a part of the firewall in the embodiment shown; in other embodiments, the wave identification engine may be a standalone process, a library, a part of an IDS, a digital signal processor (DSP), a microprocessor, or any other appropriate hardware or software used for network traffic identification purposes. More details of the wave identification engine and its operations are described in detail later.

Figure 2B:
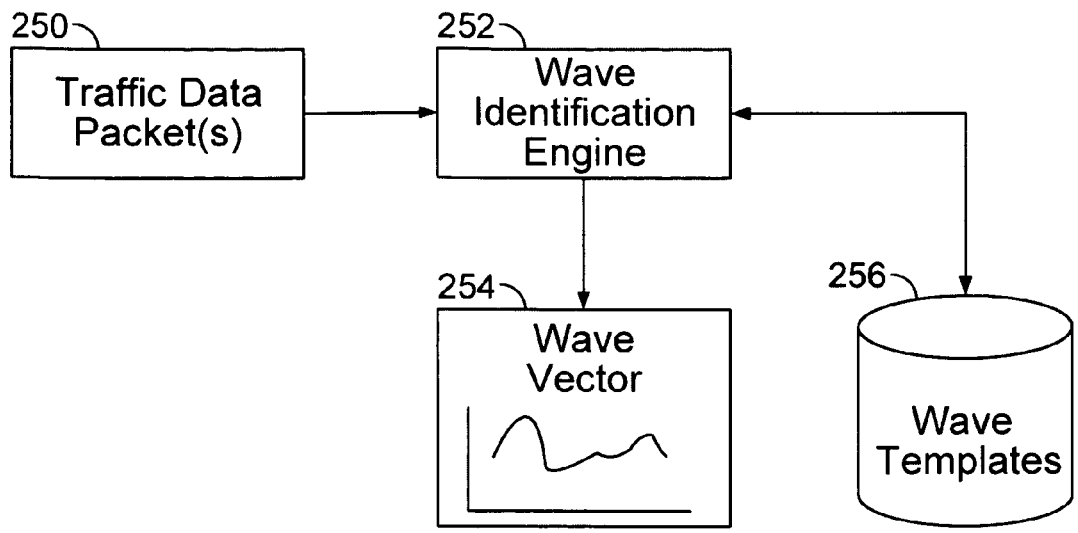
FIG. 2B is a diagram illustrating the identification of network traffic using a wave identification engine, according to one embodiment.

FIG. 2B is a diagram illustrating the identification of network traffic using a wave identification engine, according to one embodiment. One or more traffic data packets 250 are examined by a wave identification engine 252. In this embodiment, the wave identification engine converts the data in the packet into a wave vector 254 and then compares the wave with stored wave templates of various known protocols, 256; in other embodiments, the firewall may convert the data into a wave vector and then send the wave vector to the wave identification engine. The wave templates may be stored within the wave identification engine, on the network, or any other appropriate location that is accessible by wave identification engine.

There are a variety of techniques that are applicable for comparing the wave vector and the wave templates. In some embodiments, the techniques compare the wave vector with all the wave templates and choose the wave template that is the most similar to the wave vector. In other embodiments, the wave vector can be compared with a single wave template or a subset of the wave templates and the wave template that corresponds to a predetermined criteria can be selected. In some embodiments, a score is computed based on the differences between points on the wave vector and corresponding points on a wave template. In some embodiments, computations such as Fourier Transform are performed on the wave vector and the wave template to determine the degree of similarity. Other wave analysis techniques may also be used in some embodiments. These techniques sometimes involve numerical computations that are well suited for implementation using high performance hardware, such as specialized digital signal processors.

Figure 3:
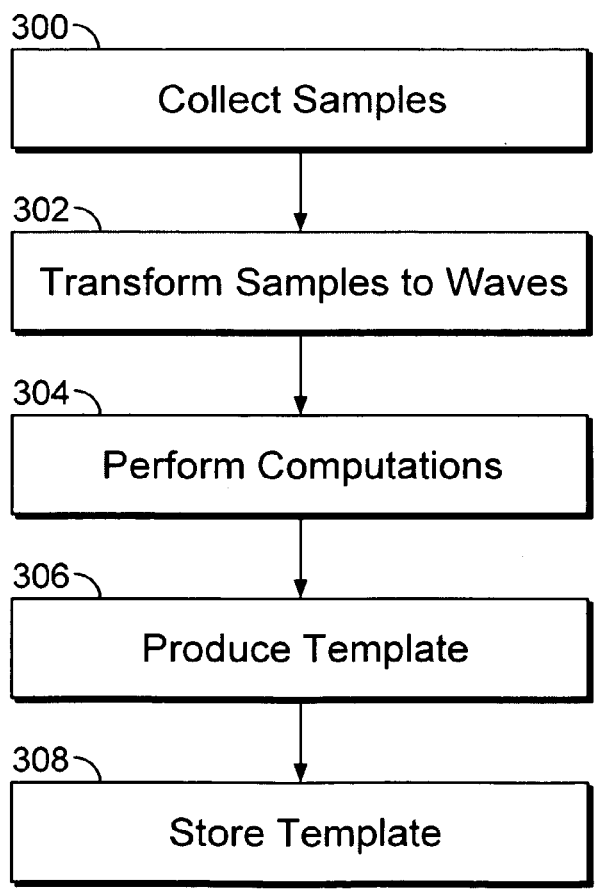
FIG. 3 is a flowchart illustrating a template construction process according to one embodiment.

FIG. 3 is a flowchart illustrating a template construction process according to one embodiment. To construct a template for a certain protocol, samples of data packets for traffic based on the protocol are taken (300). The samples may be taken from the same session or different sessions, and may be training data or live data captured from the network. The length of the sample is implementation dependent. In some embodiments, the system adapts to determine a shortest template length that would reliably determine the protocol type. Exchanges that are shorter than the template length may be padded to provide the full interval length. The samples are transformed to waves (302) and computations are performed to determine the common characteristics of the protocol (304). In some embodiments, the average or medium values of the sample waves are computed and used as the template wave vector. Once the template is produced (306), it is stored for later use (308).

Computing templates based on samples is useful since the process does not require specific knowledge about the protocol. It allows for quick generation of a set of templates even without access to the protocol specifications or the source code. Since the template is an aggregate based on multiple samples, it accounts for the variations in the patterns. For example, "GET/HTTP/1.0", "GET/HTTP/1.1" and "GET/HTTP/2.0" may appear in traffic designated for different versions of HTTP protocol.

Figure 4A:
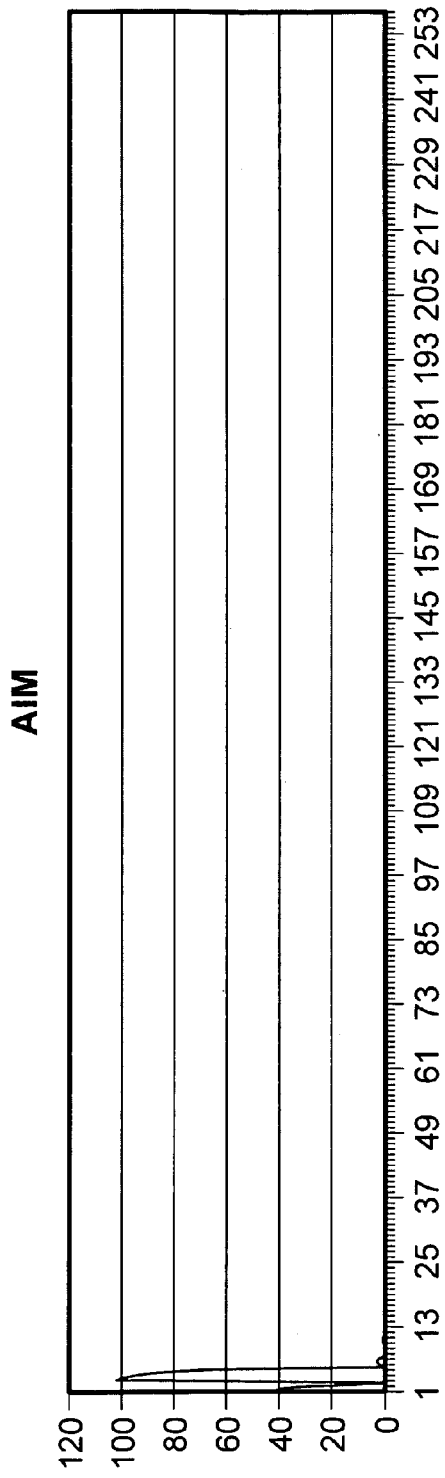
FIGS. 4A-4C are template waveform plots of several different protocols according to one embodiment.
Figure 4B:
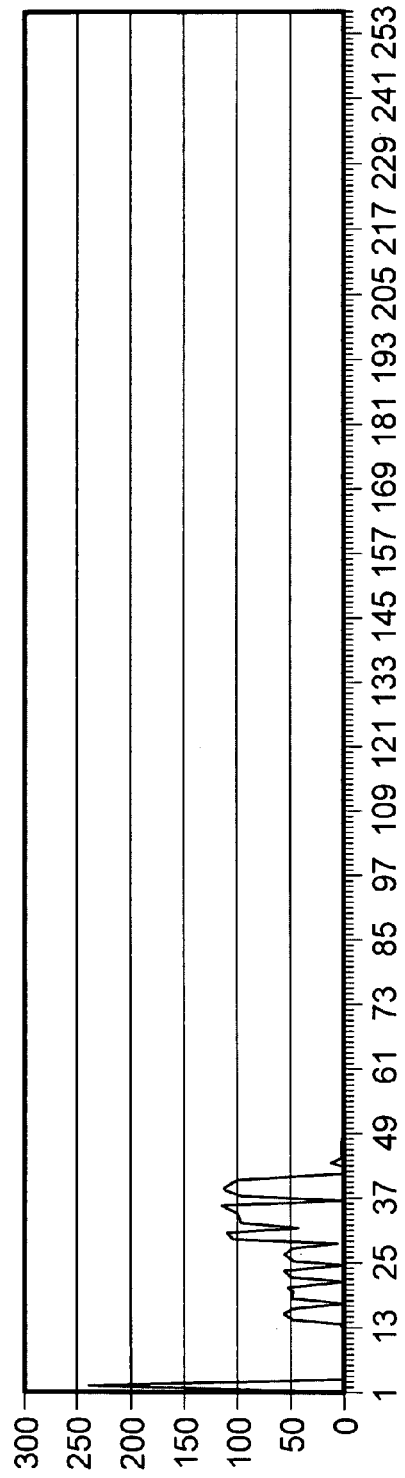
Figure 4C:
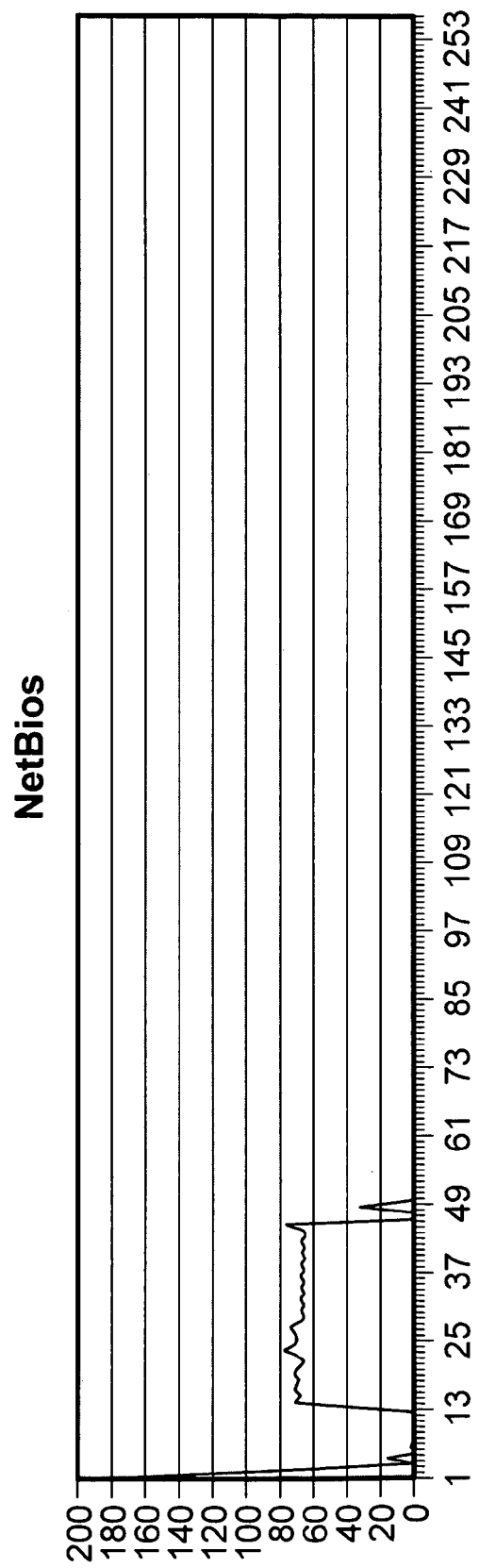

FIGS. 4A-4C are template waveform plots of several different protocols according to one embodiment. FIG. 4A is a template waveform plot for American Online Instant Messaging (AIM). FIG. 4B is a template waveform plot for domain name service (DNS). FIG. 4C is a template waveform plot for Network Basic Input/Output System (NetBios). These templates are distinct for these protocols. They are compared with the wave vectors of traffic data to determine the protocol type. The templates may be assigned numbers or identifiers to facilitate processing. For example, AIM, DNS and NetBios may have identifiers of 1, 2 and 3, respectively.

Figure 5:
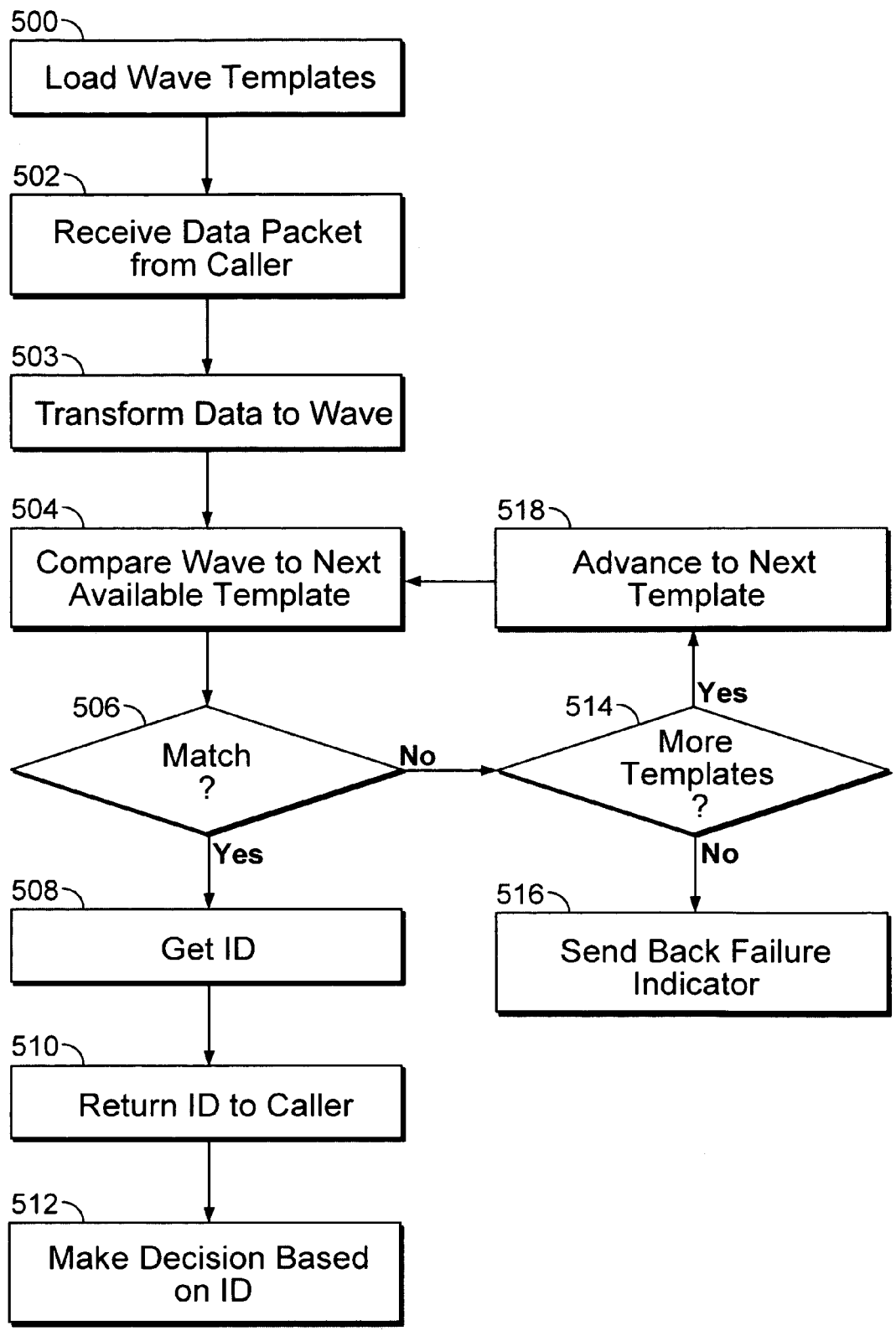
FIG. 5 is a flow chart illustrating a data identification process according to one embodiment.

FIG. 5 is a flow chart illustrating a data identification process according to one embodiment. In this example, the wave identification engine is implemented as a library that is invoked by its caller application. The caller application, such as a firewall, receives the traffic data and sends it to the wave identification engine to be processed.

The wave templates are loaded when the system is ready to process data (500). Once the wave identification engine receives the traffic data from the caller (502), it transforms the data to one or more wave vectors (503). It then compares the wave vector to the next available template (504). If the wave vector and the template are substantially similar, then an identifier for the template's corresponding application protocol is obtained (508). For example, if a wave vector is similar to the wave template shown in FIG. 4A, an identifier of 1 that corresponds to the American Online Instant Messaging protocol is obtained. There are several techniques for determining whether the wave vector and the template are substantially similar. In one embodiment, the wave vector and the template are deemed substantially similar if a score from the comparison meets a certain threshold. For example, a score may be computed based on the difference between the template and the wave vector. If the score is less than a threshold, the wave vector is deemed to be substantially similar to the template. In another embodiment, the wave vector and the template are deemed substantially similar if the template matches the wave vector better than other available templates.

In the example shown in FIG. 5, the identifier is returned to the caller (510), which then makes its policy decision based on the identifier (512). If the wave vector does not match the template, it is then determined whether there are more templates available for further determination (514). If no more templates are available at this point, then the wave identification engine has failed to find a match. A failure indicator is sent back to the caller (516). If, however, there are more templates available, the next template is provided and control is sent to 504 where the application data is compared to the next available template, and the process is repeated again. In some embodiments, the templates are sorted according to the likelihood of matching. In some embodiments, the templates are sorted according to the importance of the corresponding protocol, where more important protocols are given higher priority in the list.

In the example shown above, the application protocol is determined once a single wave template is determined to be substantially similar to the wave vector. In some embodiments, the wave vector is compared with multiple templates. The matched templates are scored and the application protocol is determined according to the score. In some embodiments, the wave vector may correspond to several protocols. An example of such a multiple correspondence is later discussed in conjunction with FIG. 7A.

Figure 6:
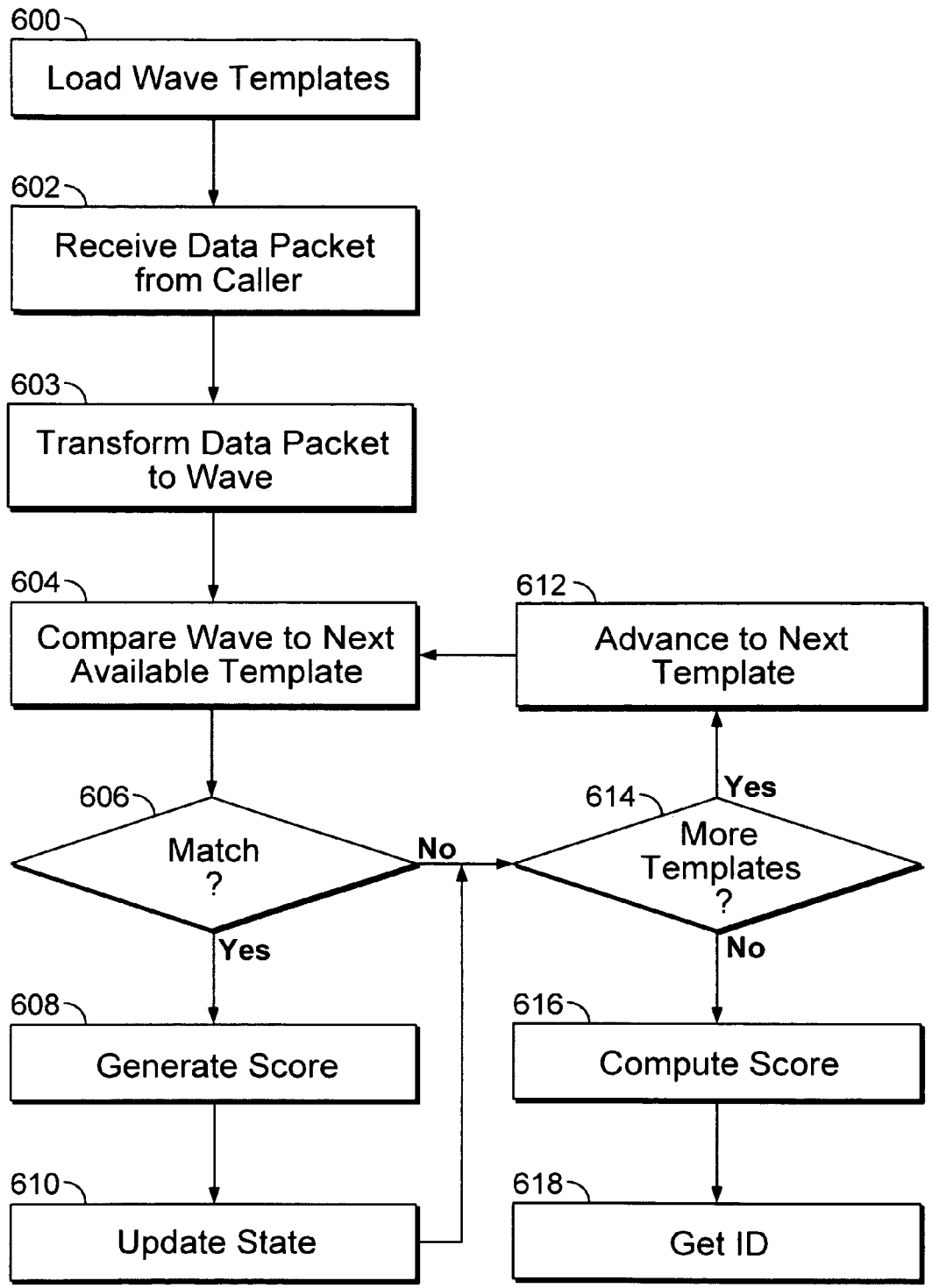
FIG. 6 is a flowchart illustrating a traffic identification process based on multiple matches, according to one embodiment.

FIG. 6 is a flowchart illustrating a traffic identification process based on multiple matches, according to one embodiment. In this example, the wave templates are loaded when the system is ready to process data (600). Once a data packet is received from the caller (602), it is transformed into a wave vector (603). The wave vector is compared to the next available template (604). If there is a match, a score is generated based on the template (608). The score is generated based on a variety of factors including how well the wave vector matches the template, the importance of the property associated with the template, and any other appropriate criteria. The wave identification engine includes a state that is used to track the score and the template associated with the score. The state is updated once the score is generated (610). Control is then transferred to 614 where it is determined whether there are more templates available for testing. If the wave vector is determined not to match the template (606), control is also transferred to 614.

If it is determined that more templates are available for testing, the next template is provided (612), and control is transferred to 604 where the wave vector and the next available template are compared again. If it is determined that all the templates have been tested, then the score is computed (616), and an identifier is determined based on the score. In some embodiments, the scores of the matches are weighed and compared to determine the most appropriate application protocol. In this embodiment as well as the embodiments described below, the templates are processed in a serial fashion. In some embodiments, the templates are compared with the wave vector in parallel for improved efficiency.

Figure 7A:
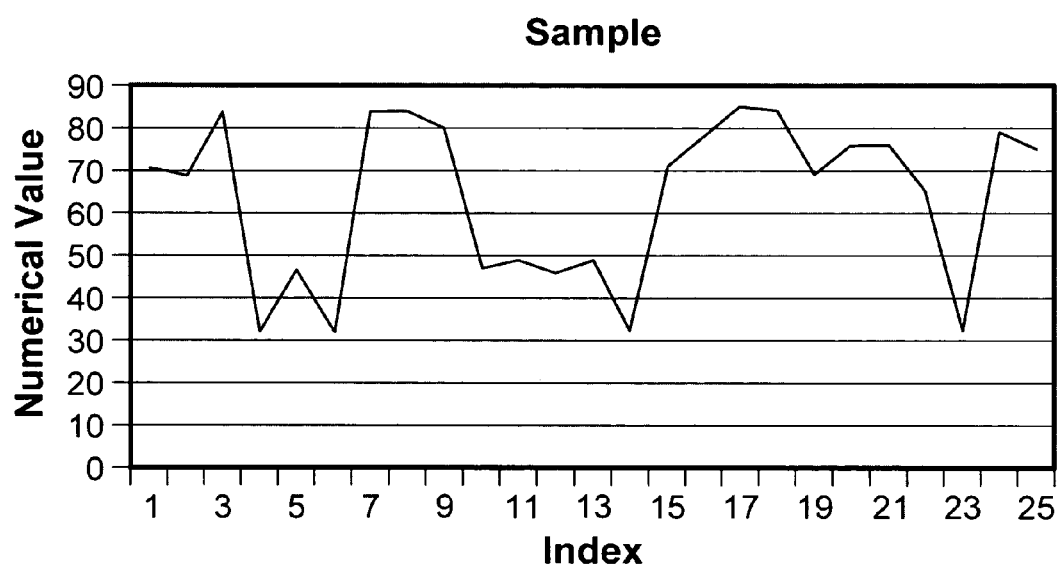
FIG. 7A is a diagram illustrating a sample wave vector of a data packet.
Figure 7B:
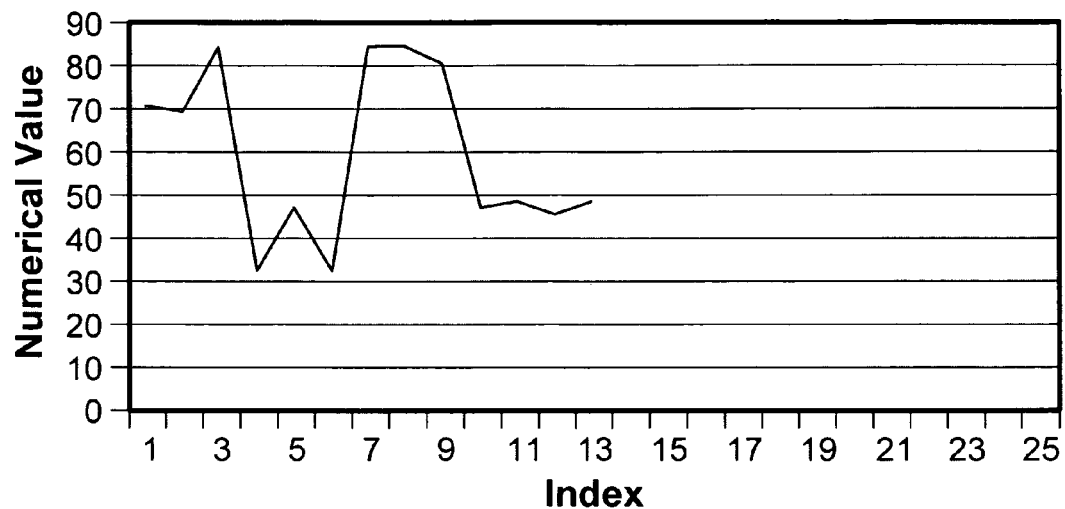
FIG. 7B is a diagram illustrating a wave template.
Figure 7C:
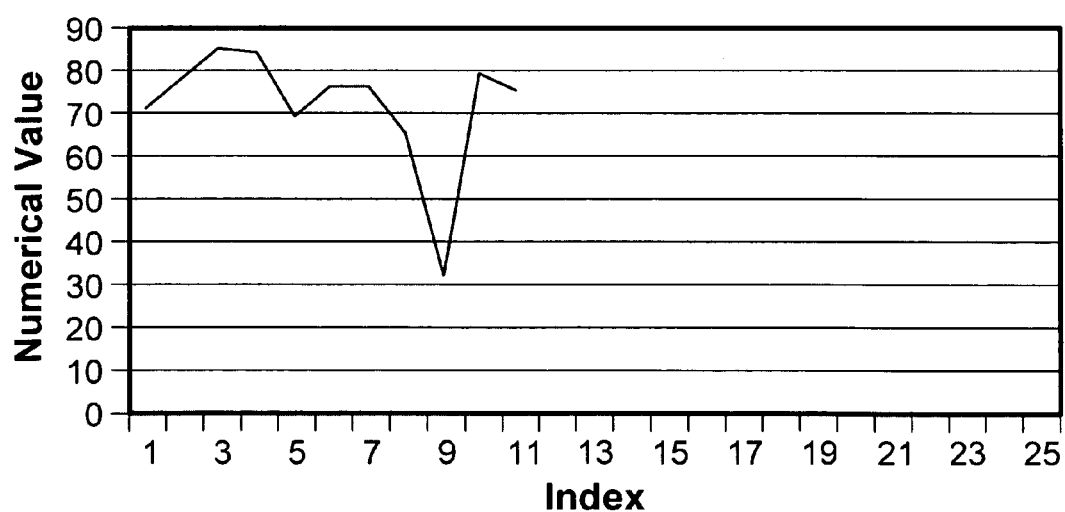
FIG. 7C is a diagram illustrating another wave template.

The following example illustrates the process shown in FIG. 6. FIG. 7A is a diagram illustrating a sample wave vector of a data packet. In this example, the wave vector is compared with multiple templates, and it is determined that the first half of the wave vector is substantially similar to a wave template of HTTP traffic illustrated in FIG. 7B. The second half of the wave vector is determined to be substantially similar to a wave template of Gnutella traffic illustrated in FIG. 7C. Although the wave vector matches two templates in this embodiment, because matching wave pattern for Gnutella protocol appeared later than the matching wave pattern for HTTP protocol, the traffic data is determined to be using Gnutella protocol with an HTTP wrapper.

Sometimes, although the application data of one packet does not result in a match, it is possible to concatenate the application data from several packets to form a new set of pattern matching data that results in a match.

Figure 8:
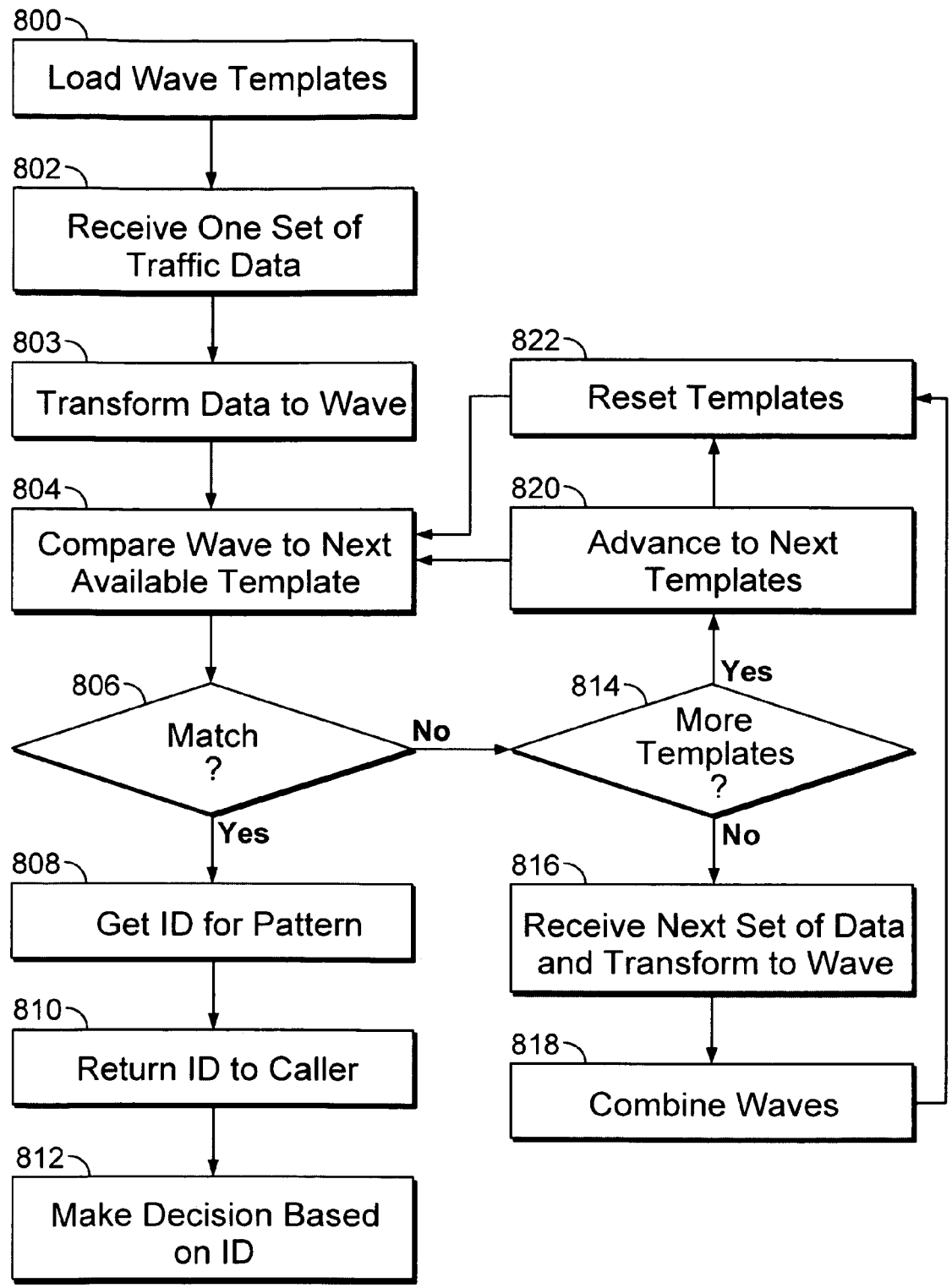
FIG. 8 is a flowchart illustrating a traffic identification process using concatenated data, according to one embodiment.

FIG. 8 is a flowchart illustrating a traffic identification process using concatenated data, according to one embodiment. In this example, wave templates are loaded by the wave identification engine at the beginning of the process (800). One set of traffic data, for example, bytes from one data packet, is received by the wave identification engine (802), transformed to a wave vector (803), and compared to the next available wave template (804). If it is determined that the wave vector matches the template, the identifier associated with the template is retrieved (808) and returned to the caller (810). Based on the identifier, the caller applies local policies to decide whether to allow the packet to pass (812). If the wave vector does not match the template, it is then determined whether more templates are available (814). If more templates are available, the engine advances to the next pattern (820) and the pattern matching data is compared to the next pattern and the matching process is completed. If, however, no more templates are available, the information from the next packet is received (816) and the new pattern matching data is combined with the existing pattern matching data (818). The combined pattern matching data is then sent to the pattern matching process. The templates are reset (822) and control is transferred to step 804 where the matching process is repeated for the combined pattern matching data.

An improved technique for identifying network traffic has been disclosed. Not only does the technique allow efficient identification of network traffic without relying on the port mapping conventions, it also provides more accurate identification without significant setup, maintenance and operating costs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method for identifying network traffic, comprising:
converting traffic data into a wave vector;
comparing the wave vector with a wave template;
determining whether the wave vector is substantially similar to the wave template; and
in the event it is determined that the wave vector is substantially similar to the wave template, identifying the traffic data as being associated with an application or network protocol with which the wave template is associated;

wherein the wave vector comprises numerical representations of the traffic data obtained by applying a transformation to a data sequence in the traffic data.

2. A method for identifying network traffic as recited in claim 1, wherein converting the traffic data into a wave vector comprises performing a transformation on the traffic data.

3. A method for identifying network traffic as recited in claim 1, wherein converting the traffic data into a wave vector comprises performing a transformation on the traffic data and zero-padding the traffic data.

4. A method for identifying network traffic as recited in claim 1, wherein converting the traffic data into a wave vector comprises mapping the traffic data to a plurality of values.

5. A method for identifying network traffic as recited in claim 1, wherein converting the traffic data into a wave vector comprises mapping the traffic data to a plurality of American Standard Code for Information Interchange (ASCII) codes.

6. A method for identifying network traffic as recited in claim 1, wherein comparing the wave vector with a wave template comprises determining a difference between the wave vector and the wave template and computing a score based on the difference.

7. A method for identifying network traffic as recited in claim 1, wherein determining whether the wave vector is substantially similar to the wave template comprises performing a Fourier Transform.

8. A method for identifying network traffic as recited in claim 1, wherein determining whether the wave vector is substantially similar to the wave template comprises determining whether the comparison meets a predetermined criteria.

9. A method for identifying network traffic as recited in claim 1, wherein determining whether the wave vector is substantially similar to the wave template comprises determining a score based on the comparison.

10. A method for identifying network traffic as recited in claim 1, wherein determining whether the wave vector is substantially similar to the wave template comprises determining a score based on the comparison and determining whether the score meets a threshold.

11. A method for identifying network traffic as recited in claim 1, wherein the wave template is a first wave template and the method further comprises determining whether the wave vector is substantially similar to a second wave template.

12. A method for identifying network traffic as recited in claim 11, wherein determining whether the wave vector is substantially similar to the second wave template comprises:

computing a first score based on the comparison of the wave vector with the first wave template;

comparing the wave vector with the second wave template;

computing a second score based on the comparison of the wave vector with the second wave template; and comparing the first score and the second score.

13. A method for identifying network traffic as recited in claim 1, wherein the traffic data includes information extracted from a data packet.

14. A method for identifying network traffic as recited in claim 1, wherein the traffic data includes information extracted from a plurality of data packets.

15. A method for identifying network traffic as recited in claim 1 further comprising returning an identifier indicating the protocol.

16. A method for identifying network traffic as recited in claim 1, in the event that the wave vector is substantially similar to the wave template, further comprising assigning a score to a match.

17. A method for identifying network traffic as recited in claim 1, wherein the wave template is created by:

collecting sample traffic;

transforming the sample traffic to a sample wave vector; and performing a computation on the sample wave vector.

18. A system for identifying network traffic, comprising:

a processor configured to convert traffic data into a wave vector; compare the wave vector with a wave template; determine whether the wave vector is substantially similar to the wave template; and in the event it is determined that the wave vector is substantially similar to the wave template, identify the traffic data as being associated with an application or network protocol with which the wave template is associated; and a memory coupled with the processor, wherein the memory is configured to provide the processor with instructions;

wherein the wave vector comprises numerical representations of the traffic data obtained by applying a transformation to a data sequence in the traffic data.

19. A computer program product for identifying network traffic, the computer program product being embodied in a computer readable medium and comprising computer instructions to be executed by a computer processor for performing the steps of:

converting traffic data into a wave vector;

comparing the wave vector with a wave template;

determining whether the wave vector is substantially similar to the wave template; and in the event it is determined that the wave vector is substantially similar to the wave template, identifying the traffic data as being associated with an application or network protocol with which the wave template is associated; wherein the wave vector comprises numerical representations of the traffic data obtained by applying a transformation to a data sequence in the traffic data.

* * * * *